(12) United States Patent
Sasase

(10) Patent No.: US 9,973,639 B2
(45) Date of Patent: May 15, 2018

(54) PORTABLE TERMINAL AND RECORDING MEDIUM

(71) Applicant: Konica Minolta, Inc., Tokyo (JP)

(72) Inventor: Naoko Sasase, Hyogo (JP)

(73) Assignee: Konica Minolta, Inc., Tokyo (JP)

( * ) Notice: Subject to any disclaimer, the term of this patent is extended or adjusted under 35 U.S.C. 154(b) by 0 days. days.

(21) Appl. No.: 14/970,083

(22) Filed: Dec. 15, 2015

(65) Prior Publication Data

US 2016/0173711 A1    Jun. 16, 2016

(30) Foreign Application Priority Data

Dec. 15, 2014 (JP) ................................ 2014-252706

(51) Int. Cl.
*H04N 1/00* (2006.01)

(52) U.S. Cl.
CPC ... *H04N 1/00307* (2013.01); *H04N 2201/006* (2013.01); *H04N 2201/0055* (2013.01); *H04N 2201/0075* (2013.01); *H04N 2201/0094* (2013.01)

(58) Field of Classification Search
CPC ....... H04N 1/00307; H04N 2201/0094; H04N 2201/0055; H04N 2201/006; H04N 2201/0075
USPC ....................................................... 358/1.15
See application file for complete search history.

(56) References Cited

U.S. PATENT DOCUMENTS 8,090,324 B2 *  1/2012  Kusakari ................ B41J 29/393
                                                    455/41.3
9,477,336 B2 * 10/2016  Kaigawa ............... G06F 3/0412
2009/0066998 A1 *  3/2009  Kato ....................... G01C 21/26
                                                    358/1.15
2012/0250059 A1   10/2012  Itogawa et al.
2012/0250060 A1 * 10/2012  Shigenobu .......... H04N 1/00387
                                                    358/1.13
2013/0155041 A1 *  6/2013  Yanai ...................... G09G 5/003
                                                    345/207
2013/0231051 A1 *  9/2013  Naruse ................... G06F 3/1204
                                                    455/41.2

(Continued)

FOREIGN PATENT DOCUMENTS

| CN | 1692673 A | 11/2005 |
| CN | 104023158 A | 9/2014 |
| JP | 2004-235962 A | 8/2004 |

(Continued)

OTHER PUBLICATIONS

Office Action in corresponding Japanese Patent Application No. 2014-252706 dated Jan. 24, 2017, with translation (11 pages).

(Continued)

*Primary Examiner* — Allen H Nguyen

(74) *Attorney, Agent, or Firm* — Yuichi Watanabe

(57) ABSTRACT

A portable terminal includes a display that displays a message and a controller that controls a cooperative operation with the image forming apparatus. The controller causes the display to display the message when the controller detects a proximity of the portable terminal to the image forming apparatus, and causes the display to stop displaying the message that is displayed on the display when an intensity of radio wave for short-range wireless communication from the image forming apparatus becomes equal or smaller than a predetermined threshold value.

8 Claims, 12 Drawing Sheets

(56) References Cited

U.S. PATENT DOCUMENTS

2014/0062675 A1* 3/2014 Murata .................. G08C 17/02
340/12.5
2014/0362248 A1* 12/2014 Ishida ................ H04N 5/23293
348/222.1

FOREIGN PATENT DOCUMENTS

| JP | 2004235962 A | * | 8/2004 | ............ G08C 19/28 |
| --- | --- | --- | --- | --- |
| JP | 2012-090077 A | | 5/2012 | |
| JP | 2012-138970 A | | 7/2012 | |
| JP | 2012-212330 A | | 11/2012 | |
| JP | 2013-247620 A | | 12/2013 | |
| JP | 2014-026163 A | | 2/2014 | |

OTHER PUBLICATIONS

First Notification of Reasons for Rejection issued in corresponding Chinese Patent Application No. 201510921437.3 dated Dec. 20, 2017, with translation (25 pages).

\* cited by examiner

PORTABLE TERMINAL AND RECORDING MEDIUM

This application is based on Japanese Patent Application No. 2014-252706 filed on Dec. 15, 2014, the contents of which are hereby incorporated by reference.

BACKGROUND OF THE INVENTION

Technical Field

The present invention relates to a portable terminal that performs a cooperative operation with an image forming apparatus and a technique relevant to the same.

Background Art

There is a technique which ensures cooperation between an image forming apparatus such as an MFP (Multi-Functional Peripheral) and a portable terminal existing outside the same (see Japanese Patent Application Laid Open Gazette No. 2012-138970 (Patent Document 1)).

For communication between an image forming apparatus and a portable terminal, various wireless communication technologies can be used. For example, a communication with wireless LAN (IEEE 802.11 or the like) and/or a short-range wireless communication can be used. As the short-range wireless communications, there are a communication in accordance with the Bluetooth (registered trademark) standard and/or an NFC (Near Field Communication). Further, in recent years, there is a communication in accordance with BLE (Bluetooth Low Energy) which is an extended standard of the Bluetooth.

By using such wireless communications for the communication between the image forming apparatus and the portable terminal, various applied technologies are created.

It is thought, for example, that when an image forming apparatus sends a radio wave therearound by using the BLE or the like and a portable terminal coming near the image forming apparatus receives the radio wave from the BLE, the portable terminal detects the proximity of itself to the image forming apparatus.

Further, the portable terminal can automatically start various operations in response to the detection of the proximity to the image forming apparatus.

When the BLE or the like is used, however, since there is a variation in the intensity of the radio wave from the image forming apparatus, it is required that the image forming apparatus should send therearound a radio wave of high intensity to some degree. As a result, there is sometimes a case where even when a user carrying the portable terminal only passes by the image forming apparatus, it is determined that the intensity of the radio wave from the image forming apparatus exceeds a certain level (plainly speaking, the portable terminal experiences an oversensitive reaction). Therefore, in such a case where the portable terminal automatically starts various operations in response to the detection of the proximity to the image forming apparatus, the operations are sometimes performed without the user's intent.

As a countermeasure therefor, the inventor of the present invention further devises a technique to display various messages (a message for confirming the use of the image forming apparatus, and the like) on a display part of the portable terminal when the user comes close to the image forming apparatus and the portable terminal carried by the user accordingly comes close to the image forming apparatus. By this technique, since various operations are started on the basis of the instruction of the user who checks the message, not automatically, it becomes possible to make the operations proceed on the basis of more reliable confirmation of the user's intent.

In such a technique, however, even if the user has no intent to use the image forming apparatus, when the user passes by the image forming apparatus while carrying the portable terminal, it is determined that the intensity of the BLE radio wave from the image forming apparatus exceeds a certain level and the message is displayed on the portable terminal not on the basis of the user's intent.

Then, if the message remains being displayed on the display part of the portable terminal even when the user has been already away from the image forming apparatus, the user may sometimes notice a useless (unavailable) message (the message for confirming the use of the image forming apparatus, or the like) for himself at that time at a place away from the image forming apparatus. While watching the message, the user, however, cannot understand why the message is displayed and feels confused about it.

SUMMARY

One or more embodiments of the present invention provide a technique to suppress the chance that a user will see a useless message on a portable terminal that performs a cooperative operation with an image forming apparatus.

One or more embodiments of the present invention are intended for a portable terminal that performs a cooperative operation with an image forming apparatus. According to one or more embodiments the present invention, the portable terminal includes a display that displays a message when the proximity to the image forming apparatus is detected and a control part for controlling a cooperative operation with the image forming apparatus, and in the portable terminal of the present invention, the control part causes the message which is displayed on the display part not to be displayed on the condition that the intensity of radio wave for short-range wireless communication from the image forming apparatus has become equal or smaller than a predetermined threshold value.

According to a second aspect of the present invention, the portable terminal includes a display part for displaying a message when the proximity to the image forming apparatus is detected and a control part for controlling a cooperative operation with the image forming apparatus, and in the portable terminal of the present invention, the control part causes the message not to be displayed on the condition that a no-operation time equal or longer than a predetermined time period elapses from the start of displaying the message or a detection value corresponding to a motion of the portable terminal is equal or larger than a constant value.

The present invention is also intended for a non-transitory computer-readable recording medium. According to a third aspect of the present invention, the non-transitory computer-readable recording medium records therein a program to be executed by a computer embedded in a portable terminal to cause the computer to perform the steps of a) displaying a message when the proximity of the portable terminal to an image forming apparatus is detected and b) causing the message not to be displayed on the condition that the intensity of radio wave for short-range wireless communication from the image forming apparatus has become equal or smaller than a predetermined threshold value.

According to a fourth aspect of the present invention, the non-transitory computer-readable recording medium records therein a program to be executed by a computer embedded in a portable terminal to cause the computer to perform the steps of a) displaying a message when the proximity of the portable terminal to an image forming apparatus is detected and b) causing the message not to be displayed on the condition that a no-operation time equal or longer than a predetermined time period elapses from the start of displaying the message or a detection value corresponding to a motion of the portable terminal is equal or larger than a constant value.

These and other objects, features, aspects and advantages of the present invention will become more apparent from the following detailed description of the present invention when taken in conjunction with the accompanying drawings.

DESCRIPTION OF EMBODIMENTS

Hereinafter, one or more embodiments of the present invention will be described with reference to figures.

1. First Example

1-1. Outline

Figure 1:
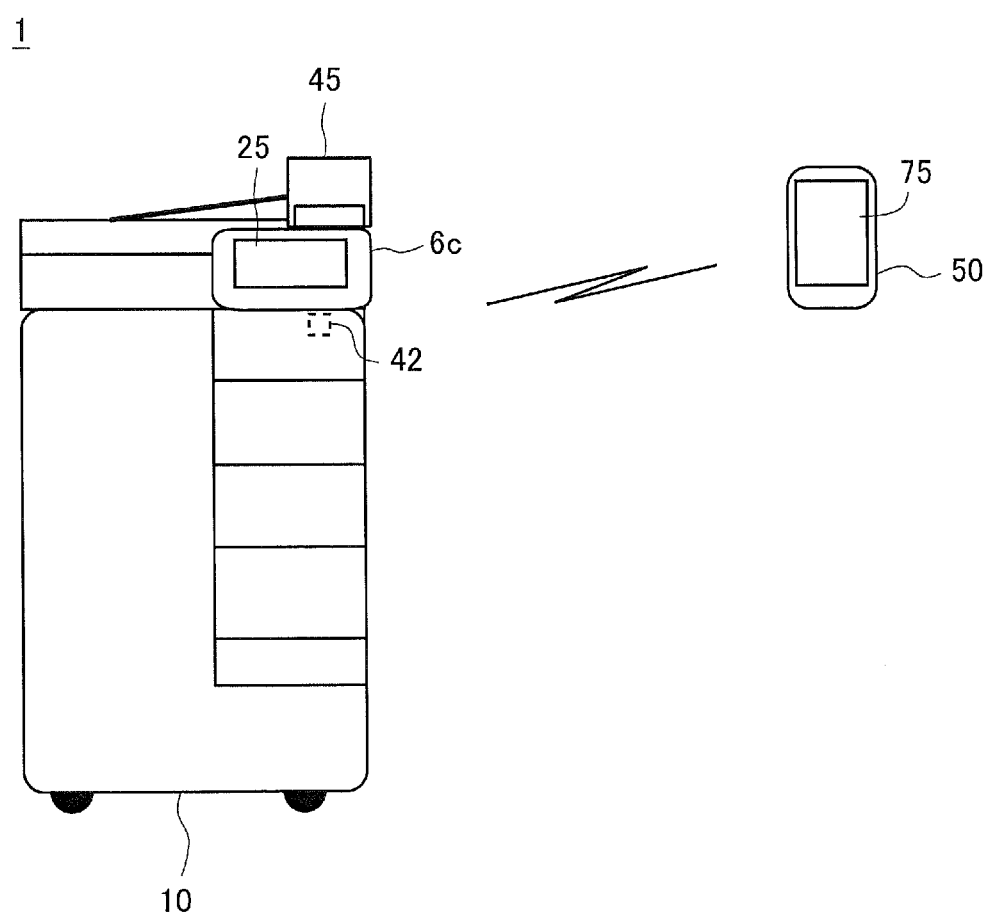
FIG. 1 is a view showing an image forming system according to one or more embodiments of the present invention.

FIG. 1 is a view showing an image forming system 1 according to one or more embodiments of the present invention. As shown in FIG. 1, the image forming system 1 comprises an MFP (image forming apparatus) 10 and a portable terminal 50.

The MFP 10 and the portable terminal 50 are connected to each other via wireless communication by using various wireless communication technologies. For the communication between the MFP 10 and the portable terminal 50, for example, a communication with wireless LAN (IEEE 802.11 or the like) and a short-range wireless communication can be used. In one or more embodiments of the present invention, as the short-range wireless communication, a communication in accordance with BLE (Bluetooth Low Energy) is used, and a process for determining a proximity between the portable terminal 50 and the MFP 10 (a proximity determination process) or the like is performed. This is only one exemplary case, however, and a communication in accordance with the Bluetooth (registered trademark) standard or an NFC (Near Field Communication) may be used as the short-range wireless communication.

Further, in one or more embodiments of the present invention, the "short-range wireless communication" includes not only the NFC but also the BLE (and Bluetooth) and the like. Even if the NFC is sometimes referred to as a "narrowly-defined short-range wireless communication", the "short-range wireless communication" of one or more embodiments of the present invention refer to a "broadly-defined short-range wireless communication" and includes not only the NFC but also the communication with the BLE and the like.

1-2. Constitution of Image Forming Apparatus

Figure 2:
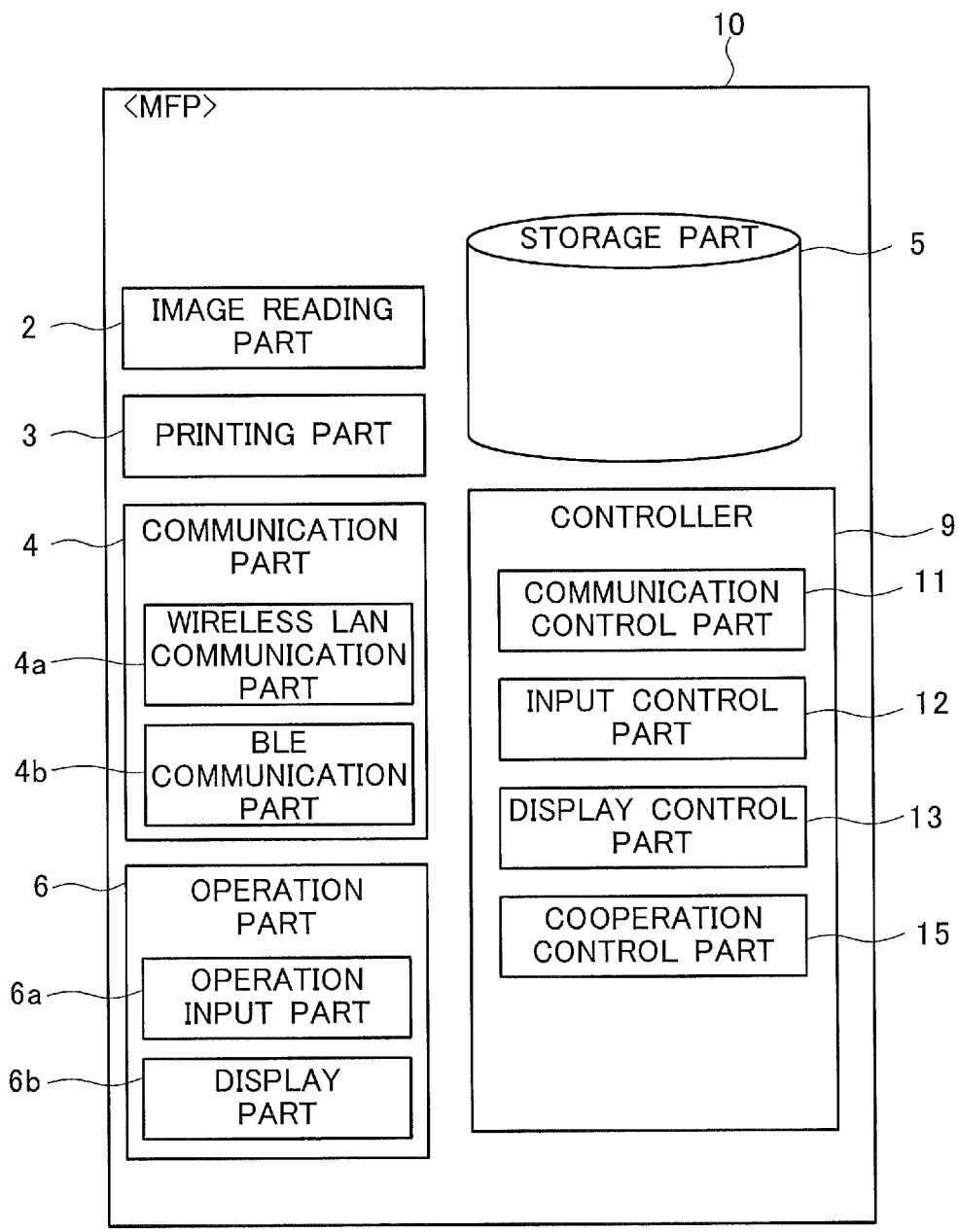
FIG. 2 is a view showing functional blocks of an MFP (image forming apparatus)

FIG. 2 is a view showing function blocks of the image forming apparatus 10. Herein, as an example of the image forming apparatus 10, shown is an MFP (Multi-Functional Peripheral). FIG. 2 shows function blocks of an MFP 10.

The MFP 10 is an apparatus (also referred to as a multifunction machine) having a scanner function, a copy function, a facsimile function, a box storage function, and the like. Specifically, as shown in the functional block diagram of FIG. 2, the MFP 10 comprises an image reader 2, a printing part 3, a communicator 4, a storage 5, an operation part 6, a controller 9, and the like and multiply uses these constituent parts to implement various functions.

The image reader 2 is a processing part which optically reads (in other words, scans) an original manuscript placed on a predetermined position of the MFP 10 and generates image data of the original manuscript (also referred to as an "original manuscript image" or a "scan image"). The image reader 2 is also referred to as a scanning part.

The printing part 3 is an output part which prints out an image to various media such as paper on the basis of the data on an object to be printed.

The communicator 4 is a processing part capable of performing facsimile communication via public networks or the like. Further, the communicator 4 is capable of performing various wireless communications (including a wireless communication in accordance with the BLE, and the like). Specifically, the communicator 4 comprises a wireless LAN communicator 4a for performing a wireless communication in accordance with the wireless LAN (IEEE 802.11 or the like) and a BLE communicator 4b for performing a wireless communication in accordance with the BLE. The MFP 10 incorporates a BLE chip 42 (also referred to as a chip for short-range wireless communication (or simply as a communication chip)) which serves as the whole or part of the BLE communicator 4b. The BLE chip 42 is capable of performing broadcast transmission of advertising data.

The storage 5 is a storage unit such as a hard disk drive (HDD) or/and the like.

The operation part 6 comprises an operation input part 6a for receiving an operation input which is given to the MFP 10 and a display part 6b for displaying various information thereon.

The MFP 10 is provided with a substantially plate-like operation panel part 6c (see FIG. 1). The operation panel part 6c has a touch panel 25 (see FIG. 1) on a front surface side thereof. The touch panel 25 serves as part of the operation input part 6a and also serves as part of the display part 6b. The touch panel 25 is a liquid crystal display panel in which various sensors or the like are embedded, and capable of displaying various information thereon and receiving various operation inputs from an operator.

The controller 9 is a control unit for generally controlling the MFP 10. The controller 9 is a computer system which is embedded in the MFP 10 and comprises a CPU, various semiconductor memories (RAM and ROM), and the like. The controller 9 causes the CPU to execute a predetermined software program (hereinafter, also referred to simply as a program) stored in the ROM (e.g., EEPROM), to thereby implement various processing parts. Further, the program (in more detail, a group of program modules) may be recorded in one of various portable (in other words, non-transitory) computer-readable recording media, such as a USB memory or the like, and read out from the recording medium to be installed in the MFP 10. Alternatively, the program may be downloaded via a network to be installed in the MFP 10.

Specifically, as shown in FIG. 2, the controller 9 executes the above-described program, to thereby implement various processing parts including a communication control part 11, an input control part 12, a display control part 13, and a cooperation control part 15.

The communication control part 11 is a processing part for controlling a communication with other apparatus(es) (the portable terminal 50 or/and the like) in cooperation with the communicator 4 and the like. The communication control part 11 has a transmission control part for controlling transmission of various data and a reception control part for controlling reception of various data.

The input control part 12 is a control part for controlling an operation inputting operation to the operation input part 6a (the touch panel 25 or the like). For example, the input control part 12 controls an operation for receiving an operation input (a specification input from a user, or the like) to an operation screen displayed on the touch panel 25.

The display control part 13 is a processing part for controlling a display operation on the display part 6b (the touch panel 25 or the like). The display control part 13 displays an operation screen (remote operation screen) 200 or the like for operating the MFP 10 on the touch panel 25.

The cooperation control part 15 is a processing part for controlling a cooperative operation with the portable terminal 50, in cooperation with the communicator 4, the communication control part 11, and the like.

1-3. Constitution of Portable Terminal

The portable terminal 50 according to one or more embodiments of the present invention is a device that performs a cooperative operation with the MFP (image forming apparatus) 10.

Next, a constitution of the portable terminal 50 according to one or more embodiments of the present invention will be described.

The portable terminal 50 is an information input/output terminal device (information terminal) capable of performing network communication with the MFP 10. Herein, as an example of the portable terminal 50, shown is a smartphone. The portable terminal 50, however, is not limited to this but may be a tablet terminal, or may be a personal computer or the like.

Figure 3:
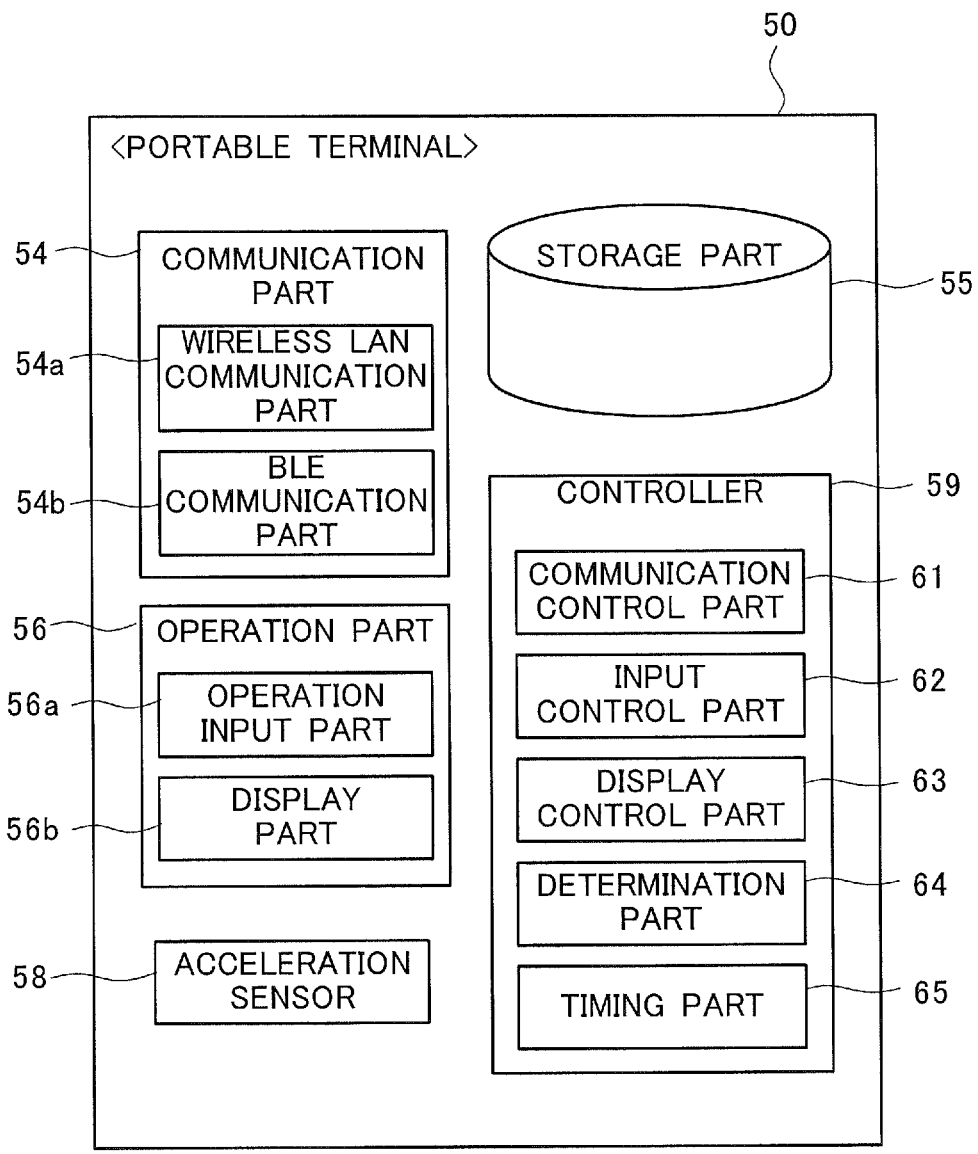
FIG. 3 is a functional block diagram showing a schematic constitution of a portable terminal.

FIG. 3 is a functional block diagram showing a schematic constitution of the portable terminal 50.

As shown in the functional block diagram of FIG. 3, the portable terminal 50 comprises a communicator 54, a storage 55, an operation part 56, an acceleration sensor 58, a controller 59, and the like and multiply uses these constituent parts to implement various functions.

The communicator 54 is capable of performing various wireless communications (including a wireless communication in accordance with the BLE, and the like). Specifically, the communicator 54 comprises a wireless LAN communicator 54a for performing a wireless communication in accordance with the wireless LAN (IEEE 802.11 or the like) and a BLE communicator 54b for performing a wireless communication in accordance with the BLE. The BLE communicator 54b receives the advertising data broadcast-transmitted from the BLE chip 42 incorporated in the MFP 10 and measures the intensity of radio wave for data transmission.

The storage 55 is a storage unit such as a nonvolatile semiconductor memory or the like. The storage 55 stores therein a message screen 200 (see FIG. 6 and the like) (in more detail, display data therefor) which will be described later.

The operation part 56 comprises an operation input part 56a for receiving an operation input which is given to the portable terminal 50 and a display 56b (may be referred to as "a display") for displaying various information thereon. The portable terminal 50 is provided with a touch panel 75 (see FIG. 1) which is a liquid crystal display panel in which various sensors or the like are embedded. The touch panel 75 serves as part of the operation input part 56a and also serves as part of the display 56b.

The acceleration sensor 58 is a detection part for detecting an acceleration of the portable terminal 50.

The controller 59 shown in FIG. 3 is a control unit for generally controlling the portable terminal 50. The controller 59 is a computer system which is embedded in the portable terminal 50 and comprises a CPU, various semiconductor memories (RAM and ROM), and the like. The controller 59 causes the CPU to execute a predetermined software program (hereinafter, also referred to simply as a program) stored in a memory (such as a semiconductor memory or the like), to thereby implement various processing parts. Further, the program (in more detail, a group of program modules) may be recorded in one of various portable (in other words, non-transitory) computer-readable recording media, such as a USB memory or the like, and read out from the recording medium to be installed in the portable terminal 50. Alternatively, the program may be downloaded via a network to be installed in the portable terminal 50.

In the portable terminal 50, installed is a program (cooperation program) for performing cooperation with the MFP 10, or the like. The cooperation program is an application software program (also referred to simply as application, or the like) for performing various processes including a process for detecting a proximity to the MFP 10 (a proximity detection process).

Specifically, the controller 59 executes the cooperation program or the like, to thereby implement various processing parts including a communication control part 61, an input control part 62, a display control part 63, a determination part 64, and a timer 65.

The communication control part 61 is a processing part for controlling a communication with the MFP 10 and the like in cooperation with the communicator 54 and the like.

The input control part 62 is a control part for controlling an operation inputting operation to the operation input part 56a (the touch panel 75 or the like).

The display control part 63 is a processing part for controlling a display operation on the display 56b (the touch panel 75 and the like). The display control part 63 controls a display operation of, for example, the message screen 200 (described later), and the like.

The determination part 64 is a processing part for performing a process for determining that the portable terminal 50 itself comes close to the MFP 10 to a certain degree on the basis of a certain criterion (a process for detecting the proximity to the MFP). Further, the determination part 64 also performs a process for determining that the portable terminal 50 itself has been away from the MFP on the basis of another criterion (a process for detecting the getting-away from the MFP).

The timer 65 is a processing part for measuring an elapsed time from a certain time.

The controller 59 uses these processing parts and the like, to thereby control the cooperative operation with the MFP 10.

1-4. Operation

The MFP 10 (in more detail, the BLE chip 42 incorporated in the MFP 10) always sends a radio wave for BLE communication (radio wave reaching only the surrounding area (for example, within several meters) of the MFP 10) in an infinitesimal time interval. In more detail, the BLE chip 42 performs broadcast transmission of advertising data.

On the other hand, the portable terminal 50 receives the radio wave for BLE communication from the MFP 10 and measures the intensity of the radio wave from the MFP 10. Specifically, the BLE communicator 54b of the portable terminal 50 receives the advertising data broadcast-transmitted from the BLE chip 42 and measures the intensity of the radio wave for data transmission. Further, the cooperation program (in an active state or a background operating state) installed in the portable terminal 50 acquires the intensity of the radio wave. The cooperation program may partially perform the measurement of the intensity of the radio wave.

As the portable terminal 50 comes closer to the MFP 10 (in other words, as the distance between the portable terminal 50 and the MFP 10 becomes smaller), the intensity of the radio wave which is detected by the portable terminal 50 (the intensity of the BLE radio wave sent out from the BLE chip 42 in the MFP 10) increases. Conversely, as the portable terminal 50 moves farther away from the MFP 10 (in other words, as the distance between the portable terminal 50 and the MFP 10 becomes larger), the intensity of the radio wave which is detected by the portable terminal 50 (the intensity of the BLE radio wave sent out from the MFP 10) decreases.

By using such characteristics, when the radio field intensity detected by the portable terminal 50 changes (increases) to a value exceeding a predetermined threshold value TH1, the portable terminal 50 determines that the portable terminal 50 itself comes close to the MFP 10. Specifically, it is determined that the distance between the portable terminal 50 and the MFP 10 (in more detail, a location of the BLE chip 42 in the MFP 10) is within a predetermined range (for example, a distance within 20 cm (distance equal or smaller than a predetermined value D1)). Further, a value of the radio field intensity at the time when the distance between the portable terminal 50 and the MFP 10 becomes closer to the distance D1 (for example, about 20 cm) may be measured in advance and the measured value may be determined as the threshold value TH1.

Specifically, first, as the user comes closer to the MFP 10, the intensity of the radio wave detected by the portable terminal 50 gradually increases. It is assumed, for example, that the user carrying the portable terminal 50 with his left hand comes closer to the MFP 10 and the portable terminal 50 held by the user's left hand is moved toward a mounting place for the portable terminal 50 (a mounting holder 45 (see FIG. 1) provided near the operation panel 6c of the MFP 10, or the like). In this case, the radio field intensity detected by the portable terminal 50 increases from a value smaller than the threshold value TH1 to another value exceeding the threshold value TH1. At this time, the portable terminal 50 determines that the portable terminal 50 itself comes close to the MFP 10 within a predetermined range. In the portable terminal 50, the cooperation program is running in the active state (or in the background operating state) or the like and various processes (the following processes) including this determination process (proximity determination process) are performed by the cooperation program.

Thus, when the intensity of the radio wave for short-range wireless communication (BLE communication) from the MFP 10 becomes higher than the threshold value TH1 for proximity detection, the portable terminal 50 determines that the portable terminal 50 itself comes close to the MFP 10 within a predetermined range. In other words, the portable terminal 50 detects the proximity to the MFP 10.

Figure 5:
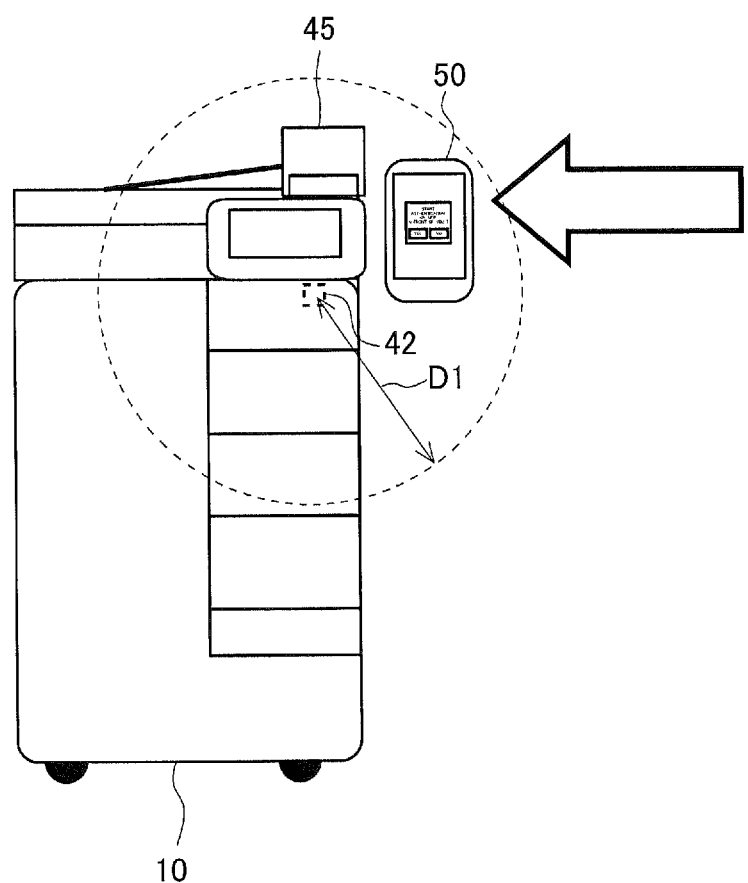
FIG. 5 is a view showing a manner in which a message screen is displayed on the portable terminal in accordance with the proximity to the MFP.
Figure 6:
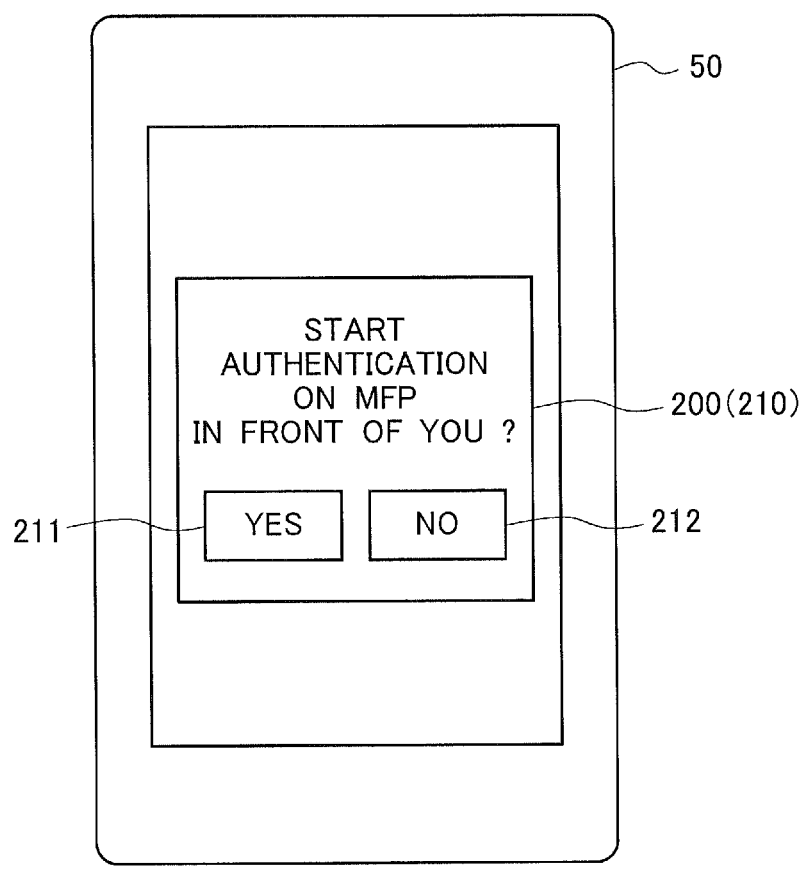
FIG. 6 is a view showing the message screen displayed on the portable terminal in accordance with the proximity to the MFP.

Then, when the portable terminal 50 (the cooperation program) detects the proximity to the MFP 10, the portable terminal displays the message screen (also referred to simply as a message) 200 on the touch panel 75, as shown in FIGS. 5 and 6. FIG. 5 is a view showing a manner in which the message 200 is displayed on the portable terminal 50 in accordance with the determination of the proximity to the MFP 10, and FIG. 6 is a view enlargedly showing the message 200. In FIG. 6, as an example of the message 200, shown is a message 210 including the sentence "Start Authentication on MFP in front of You?".

When the user intends to perform an authentication process and the like, the user presses a button 211 of "Yes" displayed on the touch panel 75. When the button 211 of "Yes" is pressed, the portable terminal 50 performs the authentication process. Specifically, the portable terminal 50 (the cooperation program) performs a series of operations (part of the cooperative operation with the MFP 10) for displaying an authentication screen on the touch panel 75, receiving the input of authentication information from the user, transmitting the inputted authentication information to the MFP 10, and receiving and displaying thereon an authentication result from the MFP 10. After the success of authentication, various operations (further part of the cooperative operation between the portable terminal 50 and the MFP 10) are performed in response to the operation input using the touch panel 75.

On the other hand, when the user does not intend to perform the authentication process, the user presses a button 212 of "No" displayed on the touch panel 75. When the button 212 of "No" is pressed, the cooperation program of the portable terminal 50 does not perform the authentication process and goes back into the background operating state.

As a situation in which the portable terminal 50 displays thereon the above-described message 200 on the basis of the radio field intensity detected by the portable terminal 50, there is the following one, as well as the above-described situation in which the user intends to use the MFP 10. There may be a possible case, for example, where the user comes closer to the MFP 10 while carrying the portable terminal 50 in his breast pocket or the like and then passes by the MFP 10 and goes farther away from the MFP 10.

In the latter case or the like, especially, when the message 200 remains being displayed on the touch panel 75 (the display) of the portable terminal 50 even after the user has been away from the MFP 10, as mentioned earlier, the user sometimes has difficulty in understanding the meaning of the message 200 depending on the location of the portable terminal 50 or the like.

Then, one or more embodiments of the present invention uses the characteristic feature that as the user moves farther away from the MFP 10, the radio field intensity detected by the portable terminal 50 gradually decreases. Specifically, the portable terminal 50 causes the touch panel 75 to stop displaying the message 200 (displayed on the touch panel 75) on the condition that the intensity of the radio wave for BLE communication (short-range wireless communication) from the MFP 10 becomes equal or smaller than a threshold value TH2.

Figure 4:
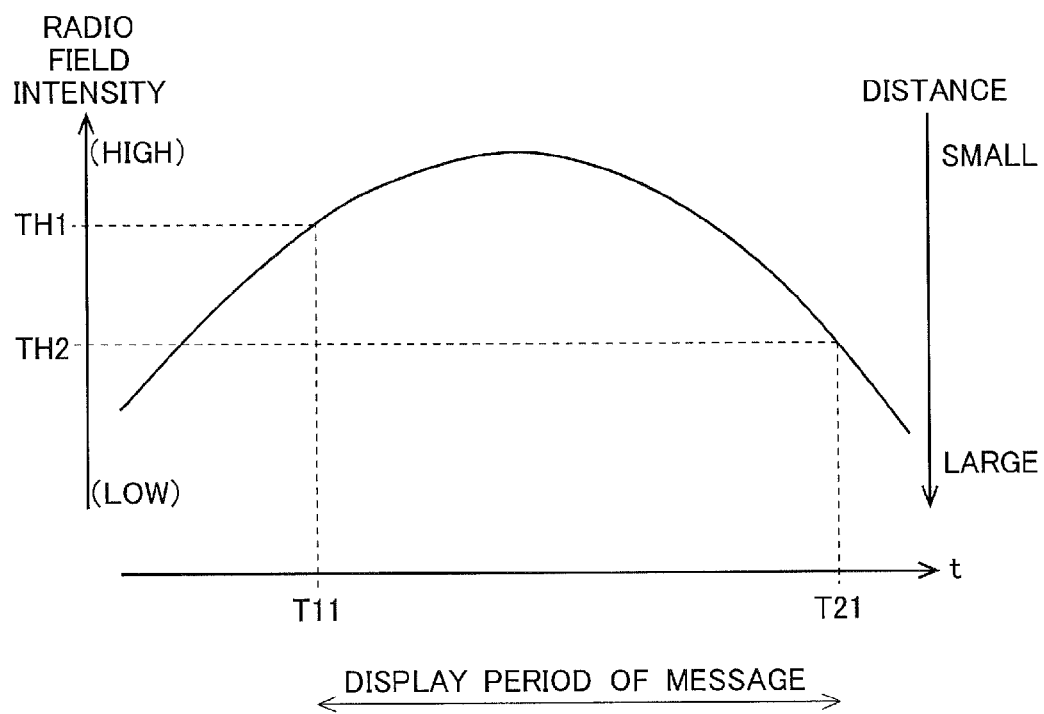
FIG. 4 is a view showing an exemplary time variation in the radio field intensity.

FIG. 4 is a view showing a time variation in the radio field intensity in the operation in which the portable terminal 50 is coming closer to the MFP 10 and then conversely going farther away from the MFP 10. Description will be made below with reference to FIG. 4.

First, when the user comes closer to the MFP 10 while carrying the portable terminal 50 (in his breast pocket or the like), the same operation as described above is performed. Specifically, when the intensity of the radio wave from the MFP 10 becomes higher than the proximity detection threshold value TH1, the portable terminal 50 determines that the portable terminal 50 itself comes close to the MFP 10 within the predetermined range and starts displaying the message 200 (at a time T11).

After that, when the user moves farther away from the MFP 10 while carrying the portable terminal 50 (in his breast pocket or the like), the radio field intensity detected by the portable terminal 50 conversely decreases. Specifically, the radio field intensity decreases to the above threshold value TH1 and then further decreases to a value smaller than the threshold value TH2 (described below) which is smaller than the above threshold value TH1. In accordance with the decrease in the radio field intensity to a value equal or smaller than the threshold value TH2, the portable terminal 50 determines that the portable terminal 50 itself has been away from the MFP 10. In this case, a value of the radio field intensity at the time when the distance between the portable terminal 50 and the MFP 10 is a distance D2 (for example, about 100 cm) (>D1) may be measured in advance and the measured value may be determined as the threshold value TH2. The threshold value TH2 is a value smaller than the threshold value TH1 and also referred to as a getting-away detection threshold value or the like.

Figure 7:
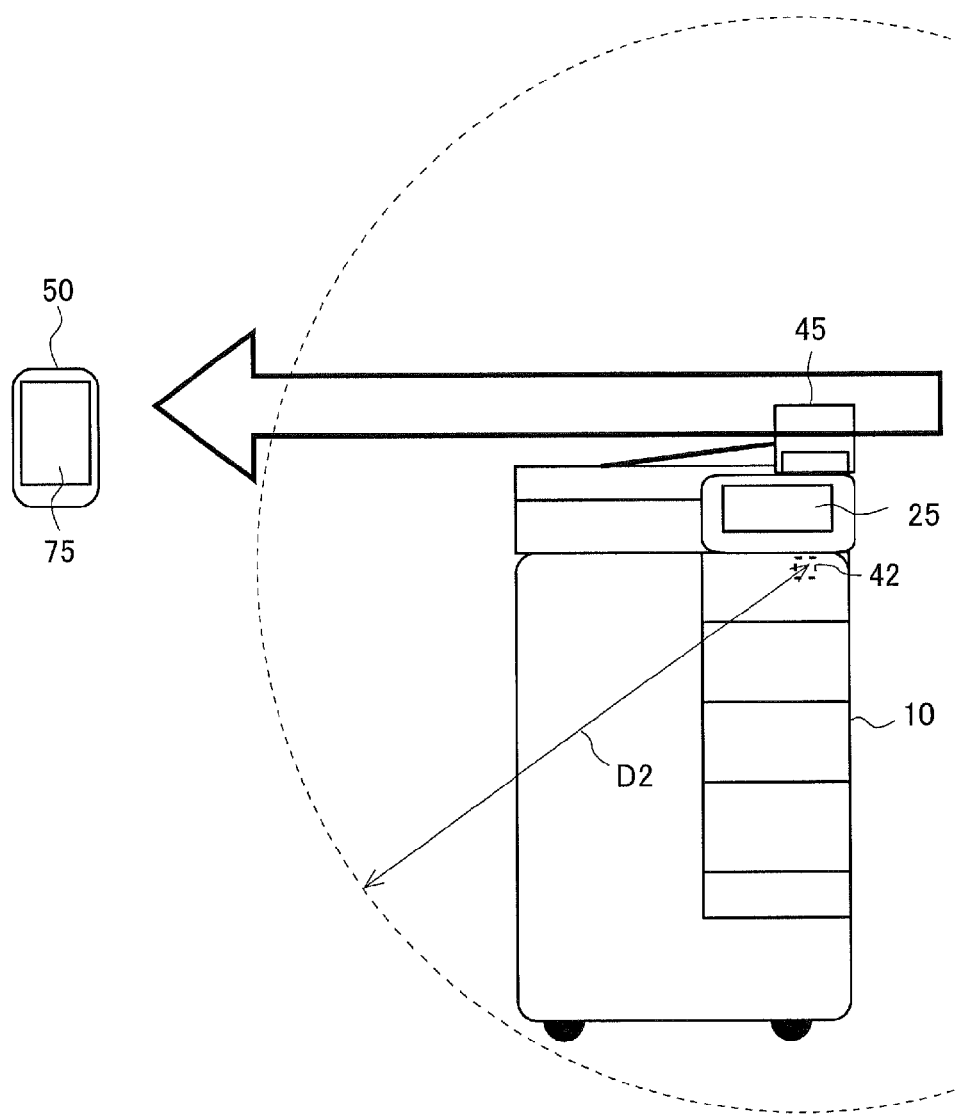
FIG. 7 is a view showing a manner in which the message screen is caused not to be displayed in accordance with the getting-away from the MFP.

Then, the portable terminal 50 brings the message 200 displayed on the touch panel 75 into a non-display state (at a time T21) (also see FIG. 7). Thus, the portable terminal 50 causes the touch panel 75 to stop displaying the message 200 on the condition that the intensity of the radio wave for short-range wireless communication (BLE communication) from the MFP 10 is equal or smaller than the threshold value TH2 (in more detail, decreases to a value equal or smaller than the threshold value TH2).

Figure 8:
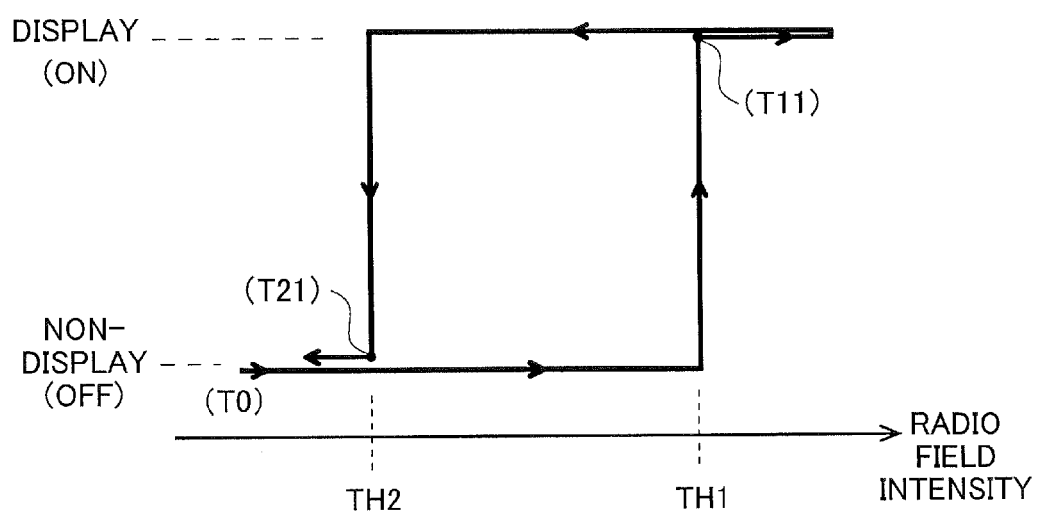
FIG. 8 is a view showing a state transition of the message screen in accordance with the radio field intensity.

FIG. 8 is a conceptual diagram showing the above-described operation and is a view showing a state transition of the message screen in accordance with the radio field intensity. In FIG. 8, shown is an operation in which at the point in time when the radio field intensity becomes higher than the threshold value TH1, the message 200 is displayed (at the time T11), and after that, at the point in time when the radio field intensity becomes equal or smaller than the threshold value TH2 (<TH1), the touch panel 75 is caused to stop displaying the message 200 (at the time T21). In other words, FIG. 8 shows a manner in which the display state of the message 200 (displayed or not displayed) is changed in accordance with the radio field intensity in a state exhibiting a kind of hysteresis.

Through the above-described operation, the touch panel 75, which once displays the message 200 in accordance with the proximity to the MFP 10, is caused to stop displaying the message 200 on the condition that the radio field intensity detected by the portable terminal 50 becomes equal or smaller than the threshold value TH2. Therefore, it is possible to suppress the chance that the user will see a useless message on the portable terminal 50 that performs the cooperative operation with the MFP 10.

Further, although the touch panel is caused to stop displaying the message 200 on the condition that the intensity of the radio wave from the MFP 10 becomes equal or smaller than the getting-away detection threshold value TH2 (a value smaller than the proximity detection threshold value TH1) in one or more embodiments of the present invention, this is only one exemplary case. For example, the touch panel may be immediately caused to stop displaying the message 200 when the radio field intensity decreases to a value equal or smaller than the threshold value TH1 (the same value as the proximity detection threshold value). In the case where the touch panel 75 is caused to stop displaying the message 200 on the condition that the radio field intensity becomes equal or smaller than the threshold value TH2 (the value smaller than the proximity detection threshold value). However, the portable terminal 50 can cause the touch panel 75 to stop displaying the message 200 while more accurately determining that the portable terminal 50 itself has been sufficiently away from the MFP 10, as compared with the case where the touch panel 75 is immediately caused to stop displaying the message 200 in accordance with the decrease in the radio field intensity to a value equal or smaller than the threshold value TH1 (the same value as the proximity detection threshold value).

2. Second Example

Although the touch panel 75 is caused to stop displaying the message on the condition that the intensity of the radio wave from the MFP 10 becomes equal or smaller than the threshold value TH2 in one or more embodiments, the present invention is not limited to this case. For example, the touch panel 75 may be caused to stop displaying the message on the condition that a no-operation time equal or longer than a predetermined time period ΔT elapses from the start of displaying the message 200.

Figure 9:
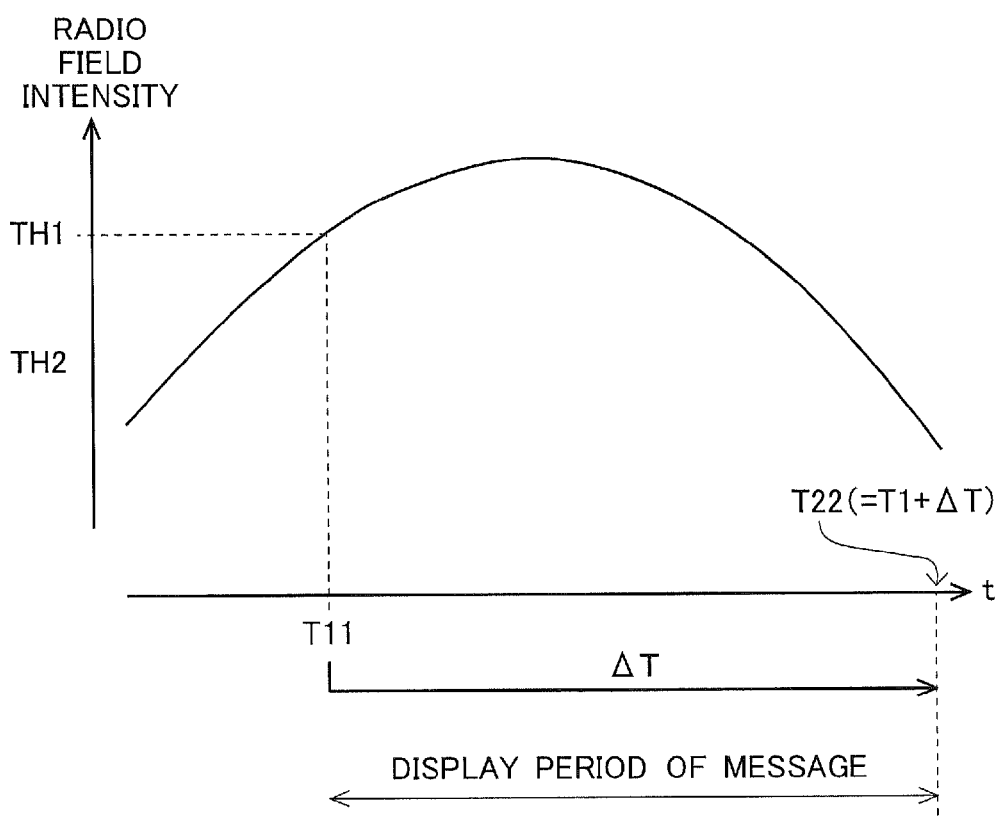
FIG. 9 is a view showing a display period of the message screen according to one or more embodiments of the present invention.

FIG. 9 is a view showing a display period of the message screen according to one or more embodiments of the present invention.

First, like in the above-described embodiments, the display of the message 200 is started (at the time T11) on the condition that the intensity of the radio wave from the MFP 10 becomes higher than the threshold value TH1.

After that, the portable terminal 50 performs a timing operation (an operation for measuring a no-operation period). Then, when a time T22 comes while a no-operation state remains, the portable terminal 50 causes the touch panel 75 to stop displaying the message 200 (see FIG. 9).

The time T22 is a time when a predetermined time ΔT (for example, 30 seconds) elapses from the time T11. The no-operation time period from the point in time when the display of the message 200 is started (the time T11) is measured by the timer 65 and the like.

In such an aspect, the touch panel 75, which once displays the message 200 in accordance with the proximity to the MFP 10, is caused to stop displaying the message 200 on the condition that the no-operation time equal or longer than the predetermined time period ΔT elapses from the start of displaying the message 200. Therefore, it is possible to suppress the chance that the user will see a useless message on the portable terminal 50 that performs the cooperative operation with the MFP 10.

3. Third Example

In one or more embodiments of the present invention, the touch panel 75 is caused to stop displaying the message 200 on the condition that a detection value (the magnitude of acceleration) of the acceleration sensor (motion detection part) 58 (see FIG. 3) is equal or larger than a constant value. The acceleration sensor 58 serves as a motion detection part (may be referred as "a motion detector") for detecting a motion of the portable terminal 50.

Figure 10:
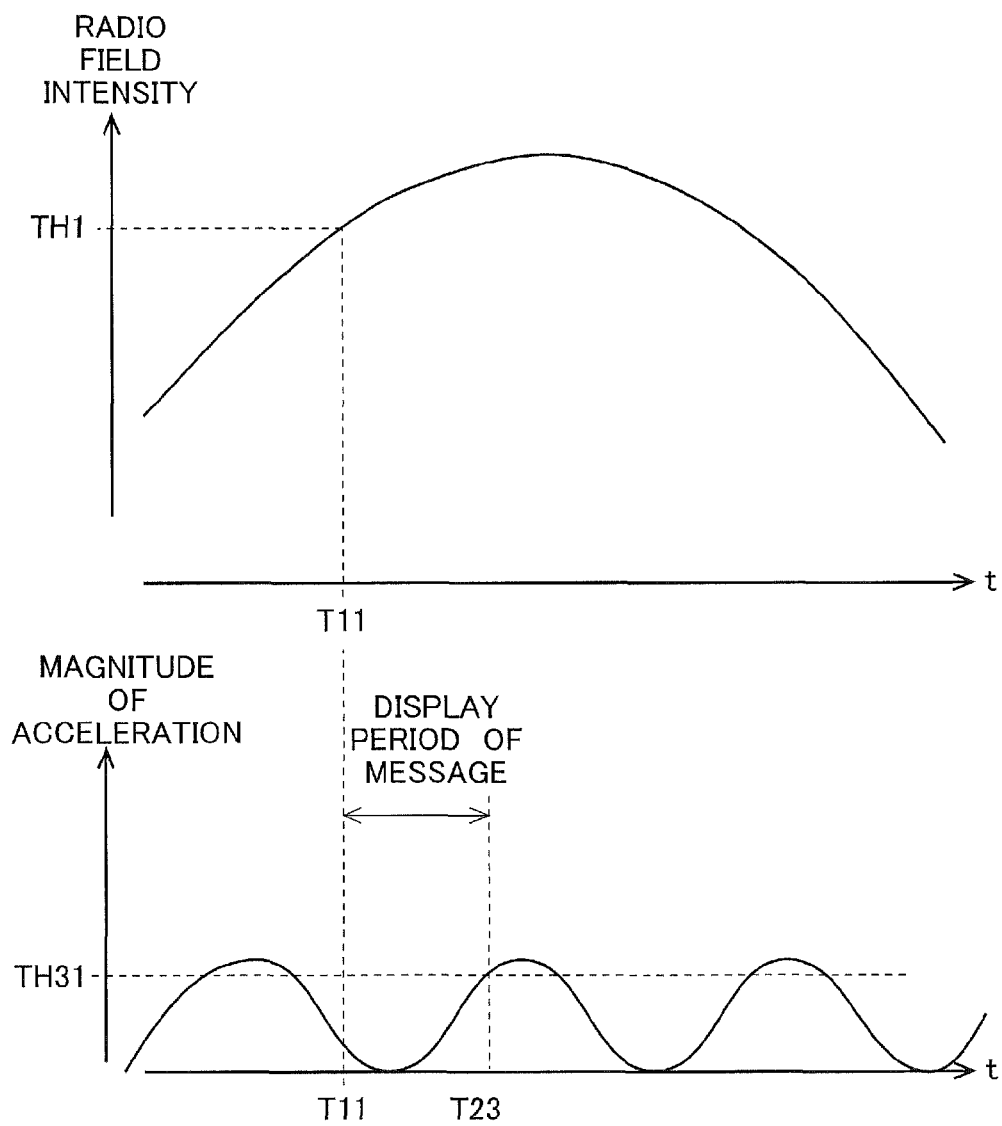
FIG. 10 is a view showing a display period of the message screen according to one or more embodiments of the present invention.

FIG. 10 is a view showing a display period of the message screen according to one or more embodiments of the present invention.

Also in one or more embodiments of the present invention, like in the above-described embodiments, the display of the message 200 is started (at the time T11) on the condition that the intensity of the radio wave from the MFP 10 becomes higher than the threshold value TH1.

After that, the portable terminal 50 starts a motion detection process by using the acceleration sensor 58.

Then, the portable terminal 50 causes the touch panel 75 to stop displaying the message on the condition that an acceleration (detection value) having a magnitude equal or larger than a constant value is detected by the acceleration sensor 58 (after the start of displaying the message) (see FIG. 10). Specifically, when the acceleration sensor 58 once detects an acceleration having a magnitude equal or larger than a constant value TH31, it is determined that the portable terminal 50 is in motion and the message 200 is brought into the non-display state (at a time T23).

In this case, the value TH31 may be set to a relatively large value, and for example, the value TH31 may be set to a value which is almost the same as the acceleration occurring when the user is walking. Further, the detection value of the acceleration sensor 58 (motion detection part) may be a value based on a signal which has passed through a low-pass filter.

In such an aspect, the touch panel 75 which once displays the message 200 in accordance with the proximity to the MFP 10 is caused to stop displaying the message 200 on the condition that the acceleration having a magnitude equal or larger than the constant value TH31 is detected by the acceleration sensor 58. Therefore, it is possible to suppress the chance that the user will see a useless message on the portable terminal 50 that performs the cooperative operation with the MFP 10.

Further, though the touch panel 75 is caused to stop displaying the message 200 in accordance with one detection of the detection value equal or larger than the constant value TH31 which is made by the acceleration sensor 58 herein, this is only one exemplary case. For example, the touch panel 75 may be caused to stop displaying the message 200 in accordance with a predetermined number of (a plurality of) detections of the detection value equal or larger than the constant value TH31 which are made by the acceleration sensor 58. In this case, it is possible to more accurately detect the user's operation of getting away from the MFP 10. Specifically, it is possible to more accurately detect the situation or the like in which the user is walking while getting away from the MFP 10.

Furthermore, though touch panel 75 is caused to stop displaying the message 200 when the acceleration having a magnitude equal or larger than the constant value TH31 (regardless of whether the value of the acceleration is positive or negative) is detected in one or more embodiments, this is only one exemplary case. For example, the touch panel 75 may be caused to stop displaying the message 200 when a positive value of acceleration (the acceleration occurring when the speed increases (the motion starts)) equal or larger than the constant value TH31 is detected.

While certain embodiments of the present invention have been described above, the present invention is not limited to the above-described cases.

Though the exemplary case has been described where the motion of the portable terminal 50 is detected by using the acceleration sensor 58 as the motion detection part in one or more embodiments, for example, the present invention is not limited to this case but the motion of the portable terminal 50 may be detected by using an angular velocity sensor (gyro sensor) or the like as the motion detection part. In more detail, the touch panel 75 may be caused to stop displaying the message 75 on the condition that a magnitude of the angular velocity or the like is equal or larger than a constant value.

Further, though the proximity and/or the getting-away of the portable terminal 50 is determined mainly by using the intensity of the radio wave for BLE communication or the like in one or more embodiments, the present invention is not limited to this case. For example, the proximity and/or the getting-away of the portable terminal 50 may be determined by using the intensity of the radio wave for any one of other wireless communications or the like.

Furthermore, though the message 210 of FIG. 6 is shown as an example of the message 200 in one or more embodiments, the present invention is not limited to this case but any one of other various messages may be used.

Figure 11:
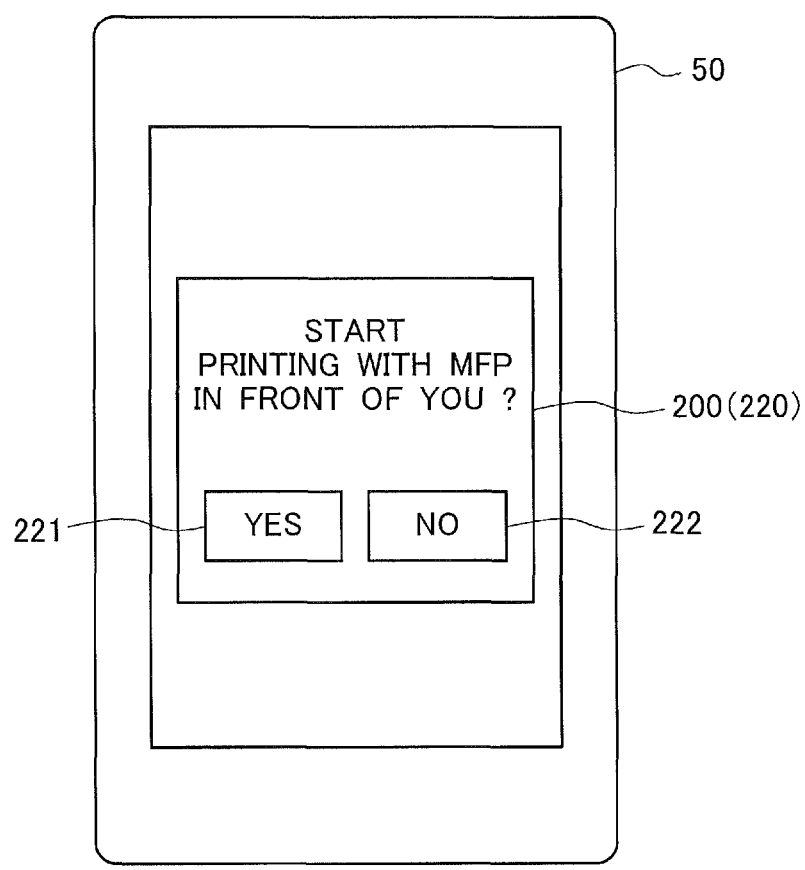
FIG. 11 is a view showing a message screen according to one or more embodiments of the present invention.

For example, a message 220 shown in FIG. 11 may be displayed as the message 200. The message 220 includes the sentence of "Start Printing with MFP in front of You?" and a button 221 of "Yes" and a button 222 of "No". When the button 221 of "Yes" in the message 220 is pressed, a printing process is started and proceeds. Further, when a certain condition (for example, the intensity of the radio wave from the MFP 10 is equal or smaller than the threshold value TH2) is satisfied, the touch panel 75 may be caused to stop displaying the message 220.

Figure 12:
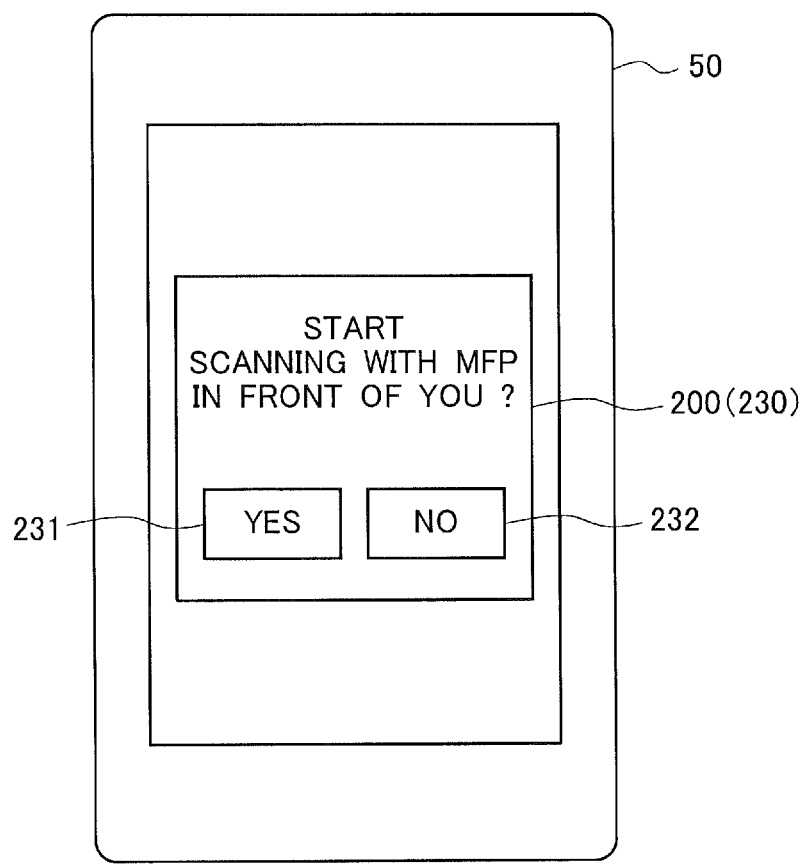
FIG. 12 is a view showing a message screen according to one or more embodiments of the present invention.

Alternatively, a message 230 shown in FIG. 12 may be displayed as the message 200. The message 230 includes the sentence of "Start Scanning with MFP in front of You?" and a button 231 of "Yes" and a button 232 of "No". When the button 231 of "Yes" in the message 230 is pressed, a scanning process on an original manuscript placed on a platen (or an ADF) of the MFP 10 is started and proceeds. Further, when a certain condition (for example, the intensity of the radio wave from the MFP 10 is equal or smaller than the threshold value TH2) is satisfied, the touch panel 75 may be caused to stop displaying the message 230.

Furthermore, though the exemplary cases have been described where the touch panel 75 is caused to stop displaying the message 200 on the condition that only one of the three conditions is satisfied in one or more embodiments, the present invention is not limited to this case. Specifically, the three conditions are:

(1) the intensity of the radio wave from the MFP 10 becomes equal or smaller than the threshold value TH2;

(2) the no-operation time equal or longer than the predetermined time period ΔT elapses from the start of displaying the message 200; and (3) the detection value of the motion detection part is equal or larger than a constant value.

Specifically, the touch panel 75 may be caused to stop displaying the message 200 on the condition that any two of the above three conditions (1) to (3) are satisfied.

In more detail, the touch panel 75 may be caused to stop displaying the message 200 on the condition that both the conditions (1) and (2) (the intensity of the radio wave from the MFP 10 becomes equal or smaller than the threshold value TH2 and the no-operation time equal or longer than the predetermined time period ΔT elapses from the start of displaying the message 200) are satisfied.

Alternatively, the touch panel 75 may be caused to stop displaying the message 200 on the condition that both the conditions (1) and (3) (the intensity of the radio wave from the MFP 10 becomes equal or smaller than the threshold value TH2 and the detection value of the motion detection part for detecting the motion of the portable terminal 50 is equal or larger than a constant value) are satisfied.

Still alternatively, the touch panel 75 may be caused to stop displaying the message 200 on the condition that both the conditions (2) and (3) (the no-operation time equal or longer than the predetermined time period ΔT elapses from the start of displaying the message 200 and the detection value of the motion detection part for detecting the motion of the portable terminal 50 is equal or larger than a constant value) are satisfied.

Further, the touch panel 75 may be caused to stop displaying the message 200 on the condition that all the three conditions (1) to (3) are satisfied. In more detail, the touch panel 75 may be caused to stop displaying the message 200 on the condition that the intensity of the radio wave from the MFP 10 becomes equal or smaller than the threshold value TH2, the no-operation time equal or longer than the predetermined time period ΔT elapses from the start of displaying the message 200, and the detection value of the motion detection part for detecting the motion of the portable terminal 50 is equal or larger than a constant value.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A portable terminal, comprising:
    a display that displays a message;
    a receiver that receives a radio wave for short-range wireless communication transmitted from an image forming apparatus; and
    a controller that controls a cooperative operation with the image forming apparatus,
    wherein the controller:
    causes the display to display the message when the controller detects a proximity of the portable terminal to the image forming apparatus; and
    causes the display to remove the message on the display when an intensity of than a redetermined threshold value, wherein
    the controller detects the proximity when the intensity of the radio wave becomes higher than a proximity detection threshold value, and the predetermined threshold value is smaller than the proximity detection threshold value.

2. The portable terminal according to claim 1, wherein the controller causes the display to stop displaying the message displayed on the display when the intensity of the radio wave becomes equal or smaller than the predetermined threshold value and a no-operation time equal or longer than a predetermined time period elapses from a start of displaying the message.

3. The portable terminal according to claim 2, further comprising:
    a motion detector that detects a motion of the portable terminal,
    wherein the controller causes the display to stop displaying the message when the intensity of the radio wave becomes equal or smaller than the predetermined threshold value, the no-operation time equal or longer than the predetermined time period elapses from the start of displaying the message, and a detection value of the motion detector is equal or larger than a constant value.

4. The portable terminal according to claim 1, further comprising:
    a motion detector that detects a motion of the portable terminal,
    wherein the controller causes the display to stop displaying the message when the intensity of radio wave becomes equal or smaller than the predetermined threshold value and a detection value of the motion detector is equal or larger than a constant value.

5. A non-transitory computer-readable recording medium for recording therein a program to be executed by a computer embedded in a portable terminal to cause the computer to perform processing comprising:
    displaying a message when a proximity of the portable terminal to an image forming apparatus is detected; and
    removing the message on a display of the portable terminal when an intensity of a radio wave for short-range wireless communication received from the image forming apparatus becomes equal or smaller than a predetermined threshold value, wherein
    the portable terminal comprises a receiver that receives the radio wave transmitted from the image forming apparatus,
    the proximity is detected when the intensity of the radio wave becomes higher than a proximity detection threshold value, and
    the predetermined threshold value is smaller than the proximity detection threshold value.

6. The non-transitory computer-readable recording medium according to claim 5, wherein the causing comprises causing to stop displaying the message when the intensity of radio wave becomes equal or smaller than the predetermined threshold value and a no-operation time equal or longer than a predetermined time period elapses from a start of displaying the message.

7. The non-transitory computer-readable recording medium according to claim 6, wherein the causing comprises causing to stop displaying the message when the intensity of radio wave becomes equal or smaller than the predetermined threshold value, the no-operation time equal or longer than the predetermined time period elapses from the start of displaying the message, and a detection value corresponding to a motion of the portable terminal is equal or larger than a constant value.

8. The non-transitory computer-readable recording medium according to claim 5, wherein the causing comprises causing to stop displaying the message when the intensity of radio wave becomes equal or smaller than the predetermined threshold value and a detection value corresponding to a motion of the portable terminal is equal or larger than a constant value.

* * * * *

UNITED STATES PATENT AND TRADEMARK OFFICE
CERTIFICATE OF CORRECTION

PATENT NO.       : 9,973,639 B2
APPLICATION NO.  : 14/970083
DATED            : May 15, 2018
INVENTOR(S)      : Naoko Sasase Page 1 of 1

It is certified that error appears in the above-identified patent and that said Letters Patent is hereby corrected as shown below:

In the Claims

At Column 14, Claim number 1, Line number 2, the phrase "when an intensity of than a redetermined threshold" should read -- when an intensity of the radio wave received from the image forming apparatus becomes equal or smaller than a predetermined threshold --.

Signed and Sealed this
Fourth Day of September, 2018

Andrei Iancu
*Director of the United States Patent and Trademark Office*